United States Patent
Geus

(10) Patent No.: US 6,541,066 B1
(45) Date of Patent: Apr. 1, 2003

(54) THIN CERAMIC COATINGS

(75) Inventor: John Wilhelm Geus, Bilthoven (NL)

(73) Assignee: Universiteit Utrecht, Utrecht (NL)

( * ) Notice: Subject to any disclaimer, the term of this patent is extended or adjusted under 35 U.S.C. 154(b) by 0 days.

(21) Appl. No.: 09/463,205

(22) PCT Filed: Jul. 21, 1998

(86) PCT No.: PCT/NL98/00417

§ 371 (c)(1),
(2), (4) Date: Jun. 12, 2000

(87) PCT Pub. No.: WO99/05342

PCT Pub. Date: Feb. 4, 1999

(30) Foreign Application Priority Data

Jul. 21, 1997 (NL) ............................................. 1006638

(51) Int. Cl.$^7$ ............................. B05D 3/02; B05D 1/36; C01B 36/00
(52) U.S. Cl. ................. 427/226; 427/376.2; 427/376.3; 427/376.4; 427/380; 427/419.4; 427/419.6; 423/700; 423/716
(58) Field of Search ........................... 427/376.2, 376.3, 427/376.4, 380, 419.4, 419.6, 226; 423/700, 716

(56) References Cited

U.S. PATENT DOCUMENTS

| | | | | |
|---|---|---|---|---|
| 4,460,630 A | * | 7/1984 | Nishino et al. .......... | 427/376.2 |
| 4,476,156 A | * | 10/1984 | Brinker et al. ........... | 427/126.2 |
| 4,535,026 A | * | 8/1985 | Yoldas et al. ................. | 216/99 |
| 5,472,927 A | * | 12/1995 | Mulder et al. .............. | 502/238 |
| 5,723,397 A | * | 3/1998 | Verduijn ........................ | 502/4 |
| 5,932,750 A | * | 8/1999 | Hayashi et al. ............. | 502/243 |
| 6,358,567 B2 | * | 3/2002 | Pham et al. ................. | 427/316 |

FOREIGN PATENT DOCUMENTS

| | | |
|---|---|---|
| EP | 0296932 | 12/1988 |
| EP | 0 560 485 | 9/1993 |
| FR | 2301496 A | 9/1976 |
| GB | 547 532 | 9/1942 |
| GB | 1604604 A | 12/1981 |
| WO | WO 79 00247 | 5/1979 |

* cited by examiner

Primary Examiner—Shrive P. Beck
Assistant Examiner—Michael Cleveland
(74) Attorney, Agent, or Firm—Weingarten, Schurgin, Gagnebin & Lebovici LLP

(57) ABSTRACT

The invention relates to a method for applying a non-permeable, ceramic layer of a thickness of not more than about 100 μm to a ceramic or metallic body by applying a solution of one or more elastomers, which elastomers contain substantially not exclusively sulfur, carbon, hydrogen and oxygen, optionally drying, and pyrolyzing to form a porous layer and subsequently sintering at increased temperature to form a non-permeable ceramic layer.

13 Claims, No Drawings

THIN CERAMIC COATINGS

This invention relates to thin ceramic layers applied to non-porous or coarse-porous ceramic or metallic substrates.

Non-porous ceramic layers are often applied as glazing to ceramic substrates or as enamel to metallic substrates. The aim of applying the layers is generally protection or embellishment.

The present invention is directed especially to the use of thin ceramic layers in the protection of metals and alloys. Primarily, this involves screening against the attack of the metal or the alloy by reaction with carbon-containing molecules in gas form. It has been observed that upon exposure of metal and alloy surfaces to carbon-containing gas molecules, such as methane or higher hydrocarbons or a mixture of carbon monoxide and hydrogen, metal or alloy particles disappear from the surface. As a result, the thickness of the metal or the alloy can decrease rapidly, giving rise to fracture in equipment working under increased pressure. In cases where work is not done under pressure, the loss of metal or the alloy can cause leakage. In other cases, the exposure of metals or alloys to hydrocarbons at increased temperature leads to the deposition of a relatively dense layer of carbon on the metal or alloy surface. This can give rise to clogging and is therefore undesirable. Before clogging occurs, however, the heat transfer from the metal or alloy wall to a gas stream is found to decrease strongly.

In many technically important cases, such as, for instance, in naphtha cracking plants, a significant reduction of the heat transfer is unallowable, since it results in a strong decrease of the capacity of the plant. The plant must be stopped and the carbon layer must be removed, for instance by oxidation. In general, this occurs by reaction with oxygen or with steam.

Technically, it is of great importance to protect metal or alloy surfaces against loss of metal or alloy particles, or against the deposition of carbon layers, by the use of a suitable coat. According to the present state of the art, the application of such a protective layer has been found not to be properly possible. It has been attempted, by starting from an aluminum-containing alloy, to apply a protective aluminum oxide layer to the metal surface. An example of such an alloy is Fecralloy®. In practice, however, a layer formed in such a way was found not to protect the metal surface sufficiently. An additional drawback of Fecralloy® is that this alloy, like other aluminum-containing alloys, cannot be welded.

In general, the fact that aluminum-containing alloys cannot be welded is a drawback of alloys that are resistant to oxidizing gases at highly increased temperature. A second object of the present invention is therefore the provision of non-permeable, oxidation-resistant ceramic layers on metals of good weldability. In that case, the metals or alloys can first be brought into the desired form by welding, whereafter the protective layer is applied.

In this connection, the invention is directed especially to rendering metal gauzes resistant. In catalytic reactions at (strongly) increased temperature, because of the intrinsic high reaction rate, no large catalytically active surface area per unit of volume is necessary. The surface area of a metal gauze is sufficient. In the oxidation of ammonia to nitrogen oxide in the production of nitric acid, use is therefore made of platinum or palladium gauzes, to which often slight amounts of other precious metals have been added. A major drawback is that the precious metal disintegrates during the catalytic reaction. Initially, use was made of a gauze of gold, arranged under the platinum gauze to catch the platinum particles. Later, a platinum gauze was used to catch the small platinum particles formed. In that case, no platinum-gold separation is needed to recover the platinum. If, in fact, no catalytic reaction proceeds over the platinum, the platinum does not disintegrate. To increase the productivity of nitric acid factories, it is highly attractive to work with pure oxygen instead of air; also at increased oxygen pressure the productivity increases strongly. However, because of the greatly accelerated disintegration of the precious metal gauze at higher oxygen pressure, this has not been found possible so far. Applying the precious metal in finely divided form to a stable gauze would enable an important improvement of the nitric acid process. This process has not been fundamentally improved since the invention by Ostwald at the end of the nineteenth century.

In the Andrussow process, in which, at temperatures above about 1000° C., ammonia is allowed to react with methane to hydrogen and hydrogen cyanide, also a noble-metal gauze is used. In this case too, a stabler metal gauze is of great significance. Finally, processes are currently being worked on, to produce synthesis gas, a mixture of carbon monoxide and hydrogen, by contacting a stream of methane and pure oxygen with a catalyst, for instance platinum, at temperatures above 1000° C. Such processes too could highly advantageously utilize precious metals applied in finely divided form to stabilized metal gauze.

Obviously, according to the state of the art of enameling, much research has already been done on the application of protective ceramic coatings to metal and alloy surfaces. In general, the conditions and the chemical composition necessary to accomplish a good bonding to the metal are known. However, it has been found to be very cumbersome to apply an enamel having a softening point or melting point that lies at a high temperature with a homogeneous chemical composition as a thin uniform layer to metal or alloy surfaces. According to the present state of the art, it is also cumbersome to accurately set the chemical composition of the protective ceramic layer. This is an important objective of the invention.

In the use of porous ceramic layers on solid surfaces, an object can be the protection against too high a temperature of the metal or the alloy upon exposure to a high-temperature gas stream. Considered in particular in this connection are gas turbines, where the metal or the alloy exhibits too slight a mechanical strength at the desired high temperatures. In that case, use can be made of a porous layer of a thermostable material which, through an effectively low heat conductivity of the porous layer, leads to a temperature profile over the porous layer such that the temperature of the metal or the alloy does not exceed a particular limit value. Firm anchorage of such a porous layer, when used in gas turbines, is obviously an important condition.

A second use contemplated by the invention is the use of a porous layer applied to a solid surface as catalyst. According to the prior art, such layers are applied to solid surfaces by using so-called dip coating techniques. The surface to be covered is immersed in a suspension of the catalytically active material and the surface is removed from the suspension at an empirically determined speed. Depending on the viscosity and the other properties of the suspension, a layer of the catalytically active material of a certain thickness then deposits on the substrate. For the production of exhaust gas catalysts, this method is presently used on a large scale. Used as substrates are, virtually exclusively, ceramic monoliths. To date, however, no successful attempts have been made to modify the dipcoat or washcoat process such that firmly anchored catalytically active layers can be applied to metal surfaces.

According to the prior art, a high-porous layer exhibiting better bonding can be applied to ceramic and metallic surfaces by starting from solutions of silicone rubber or the titanium-containing equivalent thereof. This is described, for instance, in U.S. Pat. No. 5,472,927. By dipping or by spin-coating, a thin layer of such an elastomer can be applied to the surface to be covered. Pyrolysis of the thin layer of the elastomer resulting after drying then leads to a high-porous layer of a ceramic material. A so prepared layer of silicon dioxide maintains the porosity up to temperatures of about 700° C. The thermal stability of the ceramic layer, as well as the pore distribution of the layer, can be set by adding, for instance, aluminum compounds to the solution of silicone rubber. A compound suitable for this purpose is, for instance, aluminum sec-butoxide. Mixtures of silicone rubber and the titanium-containing equivalent can be used to apply silicon dioxide with an adjustable amount of titanium dioxide.

In general, the thus obtained ceramic layers contain no catalytically active components. According to the present state of the art, those are provided by impregnation of the porous ceramic layer with a solution of a precursor of the catalytically active material. Through a thermal treatment, the precursor can be converted to the desired catalytically active component.

The present state of the art also encompasses wholly or partly converting a porous silicon dioxide layer applied to a solid substrate to a synthetic clay mineral, as is described in WO-A-96/07613. Clay minerals are catalytically of interest as solid acid catalysts.

The application of catalytically active materials to solid, non-porous or little porous surfaces has been found to be of great value when used in gas streams where a low pressure drop is essential. As mentioned above, in many such cases monoliths are used. Also other materials with a low pressure drop have been developed, whereby an intensive contact between a gas stream and a catalyst surface is effected. Examples are sintered metals, ceramic and metallic foams and in particular special reactor packings of specially shaped metal foils. The operation of special reactor packings has been described by G. Gaiser and V. Kottke in Chem.-Ing.-Technik 61 (1989) no. 9, pp. 729–731. With all these materials, it is a requirement that the catalytically active material can be applied to the surface of the structure of the reactor packing so as to be firmly anchored thereto.

Finally, reference can be made to a few other areas where catalytically active materials applied to solid surfaces can be of great significance. These areas cover catalytic liquid-phase reactions or catalytic reactions where a gaseous and a liquid reactant play a role, such as catalytic hydrogenation or oxidation reactions. According to the present state of the art, in these reactions, use is made of suspended catalysts or of a fixed catalyst bed through which the reactants are passed. Well known is the use of a fixed catalyst bed through which a liquid reactant together with a gas stream is allowed to flow down, a so-called trickle flow process. In a fixed catalyst bed, catalyst bodies with dimensions of at least a few millimeters must be used, because otherwise the pressure drop becomes too high. As a consequence, because of the low diffusion coefficient in liquids, in a fixed catalyst bed only the outer edge of the catalyst bodies contributes effectively to the catalytic reaction. This implies poor utilization of the catalyst and may also have a highly adverse effect on the selectivity of the catalytic reaction. In suspended catalyst bodies, much smaller bodies can be used, for instance of dimensions of 3 to 100 mm. Now the utilization of the catalyst is much better and the selectivity is not affected. When using such small catalyst bodies, however, the separation of the catalyst from the reactor product through settlement and decanting, filtration or centrifugation is laborious. Also, the catalyst bodies are often subject to wear, so that extremely small catalyst particles cannot be separated from the product and the reaction product is contaminated.

When applying the catalyst as a thin layer on a solid surface, the advantages of the fixed catalyst bed, no separate separation of the catalyst, are combined with those of a suspended catalyst, efficient utilization of the catalyst and good selectivity. Also, a suitable flow pattern of the liquid, and possibly the gas, around the catalyst can be realized. Thus it is possible first to mix the reactants very intimately before they contact the catalyst.

Surprisingly, it has been found that a porous ceramic layer applied to a ceramic or metallic substrate, upon treatment at a sufficiently high temperature, for instance by sintering, preferably at a higher temperature, can be converted to a dense, non-permeable layer. According to the known state of the art, the porous layer is applied by pyrolysis of a suitable polymer, or a polymer mixture or polymer solution.

According to the invention, the porous layer can be applied to non-porous or coarse-porous ceramic or metallic substrates. 'Coarse-porous' in this context is understood to mean 'containing pores of a diameter of about 1 mm or more'. The invention encompasses both non-porous, and hence non-permeable, ceramic layers and (high-)porous ceramic layers.

Suitable polymers are polymers based on organometallic compounds, such as compounds of titanium, zirconium or aluminum. In the context of the invention, silicon compounds are also regarded as organometallic compounds. In general, as polymer, elastomers can be used. In the context of the invention, elastomers are defined as polymers having a glass transition temperature of less than 0° C. Eminently suitable polymers are rubbers that are pyrolyzable to ceramic material. It has been found that silicone rubber is an eminently suitable polymer.

The thickness of the layer can be varied within wide limits. If necessary, if relatively thick layers are desired, several layers are applied one after another. It has been found to be advantageous to pyrolyze the elastomer layer before a new layer is applied. Preferably, thin layers are applied, 'thin' being understood to mean a thickness of less than 1 mm to a thickness of about 100 mm. With thin layers, the difference in thermal expansion between the ceramic layer and the substrate plays a comparatively minor role.

The chemical composition of the ceramic layer can be adjusted as desired. First of all, this is possible by setting the composition of the solution of the polymer, in accordance with the state of the art, by adding to, for instance, silicon dioxide, certain components, such as aluminum or titanium. The addition of titanium compounds readily leads to acid-resistant enamel layers, which are part of the invention. According to the method of the invention, such layers can easily and rapidly be applied to the wall of reactors. Also, by incorporation of controlled amounts of aluminum and/or titanium ions, the melting or softening point of the material of the layer can be controlled.

Alkali-resistant layers are obtained according to the invention by adding zirconium to silicon dioxide, alone or in combination with tin oxide. According to the invention, boron oxide is added preferably in the form of suitable boron compounds, such as for instance aluminum borohydride, to the solution of the elastomer.

A second procedure for incorporating certain components into the initial porous layer is impregnation of the porous layer with solutions of suitable compounds or deposition-precipitation of certain compounds in the porous layer. These procedures are attractive especially for the application of components such as nickel oxide and cobalt oxide. Reaction with the silicon oxide can be readily obtained by deposition-precipitation of these elements, but impregnation is also attractive in many cases. It is known that nickel oxide and cobalt oxide greatly improve the bonding of silicon dioxide-containing layers to metal and alloy surfaces. According to the invention, the impregnation of a suitable solution of components to be included in the ceramic layer is preferably done in the evacuated layer, whereby a volume of solution is impregnated which corresponds to the pore volume of the porous layer.

To effect good bonding of the ceramic layer to metal or alloy surfaces, the metal surface must contain a thin oxide layer. When this layer is too thick, no good bonding is obtained. In traditional enameling, this is a problem. For use at high temperatures, a ceramic layer having a high softening or melting temperature must be applied. When the softening or melting point of the enamel is high, the metal or alloy surface, upon application of the layer, is oxidized too strongly. The result is then a less good bonding. Surprisingly, it has now been found that the pyrolysis of the layer of the elastomer obtained after drying leads to an exceedingly firmly anchored porous layer. On a metal like aluminum, too, provided that the surface is sufficiently degreased and cleaned, an excellent bonding is obtained. The conversion at higher temperature, following the pyrolysis, to form a non-porous, non-permeable layer, is therefore preferably carried out in an inert gas atmosphere. The fact is, it has been found that transport of oxygen through the initially porous ceramic layer at increased temperatures can lead to strong oxidation of the metal at the interface with the ceramic layer. The metal oxide formed then presses the ceramic layer off the metal or alloy surface. In the pyrolysis of the dried layer of the elastomer, sufficient metal oxide is formed to effect a very good bonding.

According to a special embodiment of the invention, on a ceramic or metallic surface, first a protective non-porous, non-permeable layer is applied, whereafter a porous ceramic layer is deposited on the non-porous layer. The non-porous layer protects the underlying material against undesired reactions with gases at increased temperature or against corrosive action of liquids. This last can lead to a highly undesirable contamination of the reaction product. The underlying material can also exhibit undesired catalytic reactions by which selectivity is impaired. The use of such a non-porous intermediate layer thus constitutes a fundamental improvement of the prior art.

This holds especially for the use of porous layers as catalytically active layers. In fact, catalysts generally lose activity during use, for instance by poisoning. In the case of suspended catalyst bodies, replacing the catalyst is extremely simple. In the case of a packed catalyst bed, too, the catalyst can be removed from the reactor and be replaced with a new catalyst charge, although this can be relatively labor-intensive. If the catalyst is applied as a thin porous layer on a special reactor packing, the consequence of deactivation of the catalyst might be that the entire, often costly reactor packing must be replaced. For the use of catalysts according to this invention, it is therefore required in many cases that the deactivated catalyst can be relatively readily removed from the surface of the reactor packing. According to the invention, this occurs by treating the reactor packing with an alkaline or acid liquid. With most metals, an alkaline liquid can be used because metals such as iron and nickel are resistant to alkaline liquids, while silicon dioxide-containing porous layers often dissolve readily in alkaline liquids. With a metal such as aluminum, however, this presents problems, since aluminum also dissolves in alkaline liquids, forming hydrogen. Because aluminum, in view of the slight density, is especially attractive as reactor packing in larger reactors, protection of the aluminum is highly desirable. Therefore, according to a special embodiment of the invention, the substrate on which the catalytically active layer is applied, is provided with a non-permeable ceramic layer which is resistant to either acid or basic solutions. According to the present state of the art, it is known to manufacture enamel layers that are resistant to acid, to alkali or to both. As noted above, acid-resistant enamel is obtained by incorporating inter alia titanium dioxide into the enamel. Resistance to strongly acid liquids is achieved by also incorporating fluorine, which, according to the invention, is readily possible by impregnation. Alkali-resistant enamel types often contain zirconium dioxide together with fluorine, which, according to the invention, can also be readily included in the enamel. Also enamel types that are resistant to both acid and lye are known according to the prior art.

For catalytic applications at temperatures above about 700° C., the magnitude of the exposed catalytically active surface is generally of less importance than the stability of the catalyst system. Therefore, according to the invention, a metal or ceramic covered with a non-porous, non-permeable ceramic layer is used as catalyst support. The catalytically active material is applied to this surface in, if necessary, finely divided form. In this embodiment, the invention is preferably practised with gauze-shaped metal substrates.

In certain cases, for instance in catalytic oxidations, it is of importance to apply the catalytically active material thermostably in a finely divided form to such a ceramic layer. Surprisingly, it has now been found that a particularly thermostable fine division can be obtained by dissolving a suitable compound of the catalytically active metal, generally a precious metal, in the solution of the elastomer. Very good results have been obtained with acetic acid salts of palladium and platinum. As appears from measurements with X-ray photoelectron spectroscopy, a relatively large part of the precious metal, after pyrolysis and further sintering of the ceramic layer, is present at the surface.

The present invention can also be used with advantage for the application of an oxide layer to a glass surface, for instance with a view to counteracting 'scuffing' or preventing the glass surface from becoming soiled. In this connection, especially titanium oxide and combinations with titanium oxide are suitable.

The application of zeolite crystals on a solid substrate is of great practical significance. The transport in the relatively narrow pores of zeolites proceeds slowly, so that small crystallites are eminently suitable for catalytic reactions. This applies to gas-phase reactions, but especially also to liquid-phase reactions. Crystallites smaller than 1 mm cannot be properly separated from the reaction product by filtration or centrifugation. It is therefore endeavored to synthesize larger zeolite crystallites, which is often a great problem, or extremely small zeolite crystallites are included in a so-called binder, silicon dioxide or silicon dioxide/aluminum oxide, after which the combination is formed into larger bodies. Processing the zeolite/binder combination to form wear-resistant bodies of dimensions of 3 to 10 mm, however, is technically cumbersome, while the binder often impedes transport and can lead to poor selectivity. Zeolite crystallites applied to a solid substrate are therefore of great technical significance. According to the invention, such ingredients necessary for the zeolite synthesis as are not already present in the porous layer are impregnated into the pores. When, for instance, a template molecule is necessary for the synthesis of the zeolite, this template in dissolved form is impregnated in the porous ceramic layer obtained by pyrolysis of the dried elastomer layer. The aluminum necessary for the synthesis of the zeolite will generally be included in the porous layer by dissolving in the solution of the elastomer. Preferably, the volume of the solution of the ingredients of the zeolite synthesis, as described above, is chosen to be equal to the pore volume of the porous layer, which is preferably impregnated after evacuation. After the impregnation, the layer is brought under the conditions required for the nucleation and growth of the zeolite crystallites. In general, hydrothermal conditions are required for this purpose. Especially in the case of metal substrates, it is extremely simple to accurately set and maintain the temperature during the synthesis.

It is surprising that in this way zeolite crystallites very strongly bonded to solid surfaces are obtained. It is possible, according to the invention, to allow the initially porous layer to react wholly or partly to zeolite crystallites. The thickness of the layer initially applied, consisting substantially of silicon dioxide, determines the density of the zeolite crystallites on the surface. It is of great significance that the surface to be covered with zeolite crystallites does not need to be horizontally oriented during the zeolite synthesis. This makes it possible without any problem to cover complex reactor packings.

Characteristic of zeolite crystallites that, in accordance with the invention, are applied to solid ceramic or metallic substrates, is that a metal silicate is present at the boundary layer between the substrate and the zeolite crystallites. It is possible for this layer to comprise not much more than a few layers of atoms, but the layer is preferably always present. As noted above, it is of great importance for the replacement of deactivated catalysts that the catalytically active layers or the catalytically active particles can be readily removed, without the ceramic or metallic substrate being affected. Therefore, according to a preferred embodiment of the invention, the zeolite crystallites are applied to an alkali-resistant non-permeable intermediate layer.

The invention is elucidated with the following examples.

EXAMPLE I
Preparation of Porous Ceramic Layers Based on Silicon Dioxide Having Added Thereto Aluminum Oxide, Titanium Dioxide or Zirconium Dioxide.

The starting material was silicone rubber in the form of a commercial product, viz. Bison, "transparent", based on polydimethyl siloxane. This material was dissolved in diethyl ether. To the obtained solution was added aluminum sec-butoxide (ACROS), titanium isopropoxide (Jansen Chimica), or zirconium isopropoxide (Fluka). The concentration of silicone rubber in the solution was 6 to 10% by weight. With aluminum, a series having different Si/Al ratios was prepared, viz. $Si_{99}Al_1$, $Si_{70}Al_{30}$, $Si_{80}Al_{20}$, $Si_{65}Al_{35}$, $Si_{50}Al_{50}$, and $Si_{35}Al_{65}$. The titanium dioxide- and zirconium dioxide-containing silicon dioxide preparations contained Si/Ti and Si/Zr ratios of 80/20.

After pyrolysis at 873 K, the pore volume of the material was determined as a function of the Si/Al ratio. While the pure silicon dioxide exhibited a pore volume of about 0.2 ml/g, the pore volume increased to 1.4 ml/g at an Al fraction of 0.2, to decrease at higher Al fraction to about 0.4 ml/g. The accessible surface area, determined by nitrogen adsorption according to the BET theory, increased from 100 $m^2/g$ for pure silicon dioxide to 580 $m^2/g$ for an Al fraction of 0.75, then to decrease again to about 300 $m^2/g$ for pure aluminum oxide.

For preparations with Si/Al, Si/Ti and Si/Zr ratios of 80/20, the accessible surface area was determined as a function of the temperature. The samples were held at the different temperatures for 3 hours. For all three preparations the surface area of 200 to 260 $m^2/g$ after calcining at 873 K gradually decreased to 70 to 180 $m^2/g$ after calcining at 1173 K. The material with zirconium dioxide was found, after calcining at 1173 K, to exhibit the highest surface area. While pure silicon dioxide can be readily sintered to form a non-permeable layer at about 1073 K, it is necessary, with increasing contents of aluminum, zirconium or titanium, to heat at considerably higher temperatures. The content of aluminum, titanium or zirconium is selected depending on the temperature at which the material covered with a protective layer is to be used.

The material with $Si_{99}Al_1$ was used to examine the density. To that end, the material was applied to stainless steel. A sample of the stainless steel, without having been covered with a layer, was heated at 900° C. in a thermobalance. A rapid weight increase showed that the material oxidized relatively fast. Analysis showed that the surface was covered with a high-porous mass of chromium oxide upon completion of the experiment. When on a similar plate of stainless steel a layer with the specified ratio of Si/Al had been applied, which was subsequently sintered in an inert atmosphere at 1200° C., not any change in weight was observed after correction for the change in the upward pressure upon increase of the temperature.

EXAMPLE II
Application of ZSM-5 (MFI) Zeolite Crystallites on a Stainless Steel Substrate.

In this case, the starting point was a layer of porous silicon dioxide prepared by applying silicone rubber to stainless steel and decomposition of the silicone rubber layer at 773 K. As template molecule, the tetramethyl-ammonium from CFZ (Chemische Fabriek Zaltbommel) was used. Together with NaOH the tetrapropylammonium was impregnated in the pore volume of the porous layer. Subsequently, the zeolite was synthesized under hydrothermal conditions at 140° C. Photographs clearly showed that the resultant surface was homogeneously covered with zeolite crystallites.

What is claimed is:

1. A method for applying a non-permeable, ceramic layer of a thickness of not more than about 100 μm to a ceramic or metallic body by applying a solution of one or more organometallic elastomers, optionally drying, and pyrolyzing to form a porous layer and subsequently sintering at increased temperature to form a non-permeable ceramic layer.

2. A method according to claim 1, wherein the solution of elastomers further contains aluminum and/or titanium ions.

3. A method according to claim 2, wherein the solution of elastomers further contains titanium dioxide.

4. A method according to claim 3, wherein the solution of elastomers further contains fluorine ions.

5. A method according to claim 4, wherein:
   the solution of elastomers further contains zirconium ions;
   the sintering is carried out in an inert atmosphere;
   the composition of the non-permeable ceramic layer to be obtained is adjusted by impregnating the porous layer with a solution of desired constituents; and
   substantially exclusively the pore volume of the porous layer is impregnated.

6. A method according to claim 1, wherein the solution of elastomers further contains zirconium ions.

7. A method according to claim 1, wherein the sintering is carried out in an inert atmosphere.

8. A method according to claim 7, wherein:
   the composition of the non-permeable ceramic layer to be obtained is adjusted by introducing desired constitutents into the porous layer by deposition-precipitation;
   priorly an oxide layer has been applied to the body;
   the solution of elastomers further contains a catalytically active compound;
   the porous layer, which further contains, if necessary, aluminum, is impregnated with constituents necessary for zeolite synthesis, and that zeolite synthesis occurs by employing conditions needed therefor.

9. A method according to claim 1, wherein the composition of the non-permeable ceramic layer to be obtained is adjusted by impregnating the porous layer with a solution of desired constituents.

10. A method according to claim 1, wherein the composition of the non-permeable ceramic layer to be obtained is adjusted by introducing desired constituents into the porous layer by deposition-precipitation.

11. A method according to claim 1, wherein priorly an oxide layer has been applied to the body.

12. A method according to claim 1, wherein the solution of elastomers further contains a catalytically active compound.

13. A method according to claim 1, wherein the porous layer, is impregnated with constituents necessary for zeolite synthesis, and that zeolite synthesis occurs by employing conditions needed therefor.

* * * * *